(12) United States Patent
Bean et al.

(10) Patent No.: US 11,601,277 B1
(45) Date of Patent: Mar. 7, 2023

(54) DOMAIN ISOLATED PROCESSING FOR COALITION ENVIRONMENTS

(71) Applicant: Rockwell Collins, Inc., Cedar Rapids, IA (US)

(72) Inventors: Reginald D. Bean, Center Point, IA (US); James A. Marek, Anamosa, IA (US); Edward C. Tubbs, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 137 days.

(21) Appl. No.: 17/100,165

(22) Filed: Nov. 20, 2020

(51) Int. Cl.
| | |
|---|---|
| *H04L 9/32* | (2006.01) |
| *H04L 9/08* | (2006.01) |
| *H04L 12/851* | (2013.01) |
| *H04L 47/2441* | (2022.01) |
| *H04L 47/2483* | (2022.01) |

(52) U.S. Cl.
CPC .......... *H04L 9/3215* (2013.01); *H04L 9/0877* (2013.01); *H04L 47/2441* (2013.01); *H04L 47/2483* (2013.01)

(58) Field of Classification Search
CPC . H04L 9/3215; H04L 9/0877; H04L 47/2441; H04L 47/2483; H04L 9/32; H04L 9/08; H04L 12/851
See application file for complete search history.

(56) References Cited

U.S. PATENT DOCUMENTS

| | | | |
|---|---|---|---|
| 8,161,281 B1 | 4/2012 | Johnson et al. | |
| 8,769,127 B2 | 7/2014 | Selimis et al. | |
| 8,904,556 B1* | 12/2014 | Bertram | H04L 63/105 726/28 |
| 9,660,966 B1 | 5/2017 | Marek et al. | |
| 9,799,229 B2 | 10/2017 | Wokurka et al. | |
| 9,804,813 B2 | 10/2017 | Fugate et al. | |
| 9,894,043 B2 | 2/2018 | Khoury et al. | |
| 9,923,923 B1* | 3/2018 | Sharifi Mehr | H04L 9/14 |

(Continued)

FOREIGN PATENT DOCUMENTS

EP     3367628 B1     7/2020

*Primary Examiner* — Quazi Farooqui
(74) *Attorney, Agent, or Firm* — Suiter Swantz pc llo (57) ABSTRACT

A first cryptographic communication system is disclosed. The first cryptographic communication system includes a common hardware module configured to receive local cryptographic signals and coalition cryptographic signals that includes a transmitter, a receiver, a common router, a trusted router, and a data loader. The first cryptographic communication system further includes a local cryptographic assembly and a coalition cryptographic assembly each including and end cryptographic unit communicatively coupled to the trusted router, a cross domain guard communicatively coupled to the end cryptographic unit and the trusted router, and a general purpose security module communicatively coupled to the cross domain guard. The first cryptographic communication system further includes a data recoding module communicatively coupled to the data loader that includes local and coalition data recording devices. A cryptographic communication networking is also disclosed that includes the first cryptographic communication system and a second cryptographic communication system.

13 Claims, 7 Drawing Sheets

(56) References Cited

U.S. PATENT DOCUMENTS

| | | |
|---|---|---|
| 10,708,236 B2 | 7/2020 | Takahashi |
| 2007/0083768 A1* | 4/2007 | Isogai .................... G06F 21/51 |
| | | 713/189 |
| 2010/0031342 A1 | 2/2010 | Vogsland |
| 2012/0151209 A1 | 6/2012 | Visnyak et al. |
| 2017/0063789 A1 | 3/2017 | Marcinkowski et al. |
| 2018/0060611 A1 | 3/2018 | Houser et al. |
| 2019/0386957 A1 | 12/2019 | Leon |
| 2020/0084229 A1 | 3/2020 | Areno et al. |

\* cited by examiner

DOMAIN ISOLATED PROCESSING FOR COALITION ENVIRONMENTS

BACKGROUND

Communication between coalitions of mission participants require multilevel security systems. These security systems handle information with different classifications (e.g., different security levels), permitting access by participants/applications with different security clearances, and prevent participants/applications from obtaining access to information for which they lack authorization. Information handled within these security systems are often encrypted via cryptographic systems that enable mission participants to exchange information (e.g., test data, training data, and/or live virtual constructive data (LVC)) at different classification levels/algorithms. For example, a mission participant may utilize a specific encryption level/algorithm for domestic-only communication, and a different encryption level/algorithm for international communication.

Encryption units within multilevel security systems are required to support cryptographic systems from differing entities, which requires evaluation and/or certification by multiple mission participants. Current encryption units are limited in their interoperability, or efficiency of interoperability, with multilevel security systems that encrypt information under differing cryptographic systems. Thus, it is desirable to provide a system or method that avoids the shortcomings of conventional approaches.

SUMMARY

A first cryptographic communication system is disclosed. In one or more embodiments, the first cryptographic communication system includes a common hardware module configured to receive local cryptographic signals and coalition cryptographic signals. In some embodiments, the common hardware module includes a receiver. In some embodiments, the common hardware module includes a transmitter. In some embodiments, the common hardware module includes a common router. In some embodiments, the common hardware module includes a data loader communicatively coupled to the common router. In some embodiments, the common hardware module includes a trusted router. In some embodiments, the first cryptographic communication system includes a local cryptographic assembly configured to process the local cryptographic signals. In some embodiments, the local cryptographic assembly includes a local end cryptographic unit coupled to the common router. In some embodiments, the local cryptographic assembly includes a local cross domain guard communicatively coupled to the local end cryptographic unit and the trusted router. In some embodiments, the local cryptographic assembly includes one or more local general purpose security modules communicatively coupled to the local cross domain guard. In some embodiments, the first cryptographic communication system includes a coalition cryptographic assembly configured to process the local cryptographic signals. In some embodiments, the coalition cryptographic assembly includes a coalition end cryptographic unit communicatively coupled to the common router. In some embodiments, the coalition cryptographic assembly includes a coalition cross domain guard communicatively coupled to the local end cryptographic unit and the trusted router. In some embodiments, the coalition cryptographic assembly includes one or more coalition general purpose security modules communicatively coupled to the local cross domain guard. In some embodiments, the first cryptographic communication system includes a data recording module communicatively coupled to the data loader. In some embodiments, the data recording module includes a local data recording device. In some embodiments, the data recording module includes a coalition data recording device.

In some embodiments of the first cryptographic communication system, the first cryptographic communication system is configured to accommodate multiple channels.

In some embodiments of the first cryptographic system, one or more channels within the multiple channels are configured to independently host a cryptographic algorithm.

In some embodiments of the first cryptographic communication system, the first cryptographic communication system is configured with multiple security level processing.

In some embodiments of the first cryptographic communication system, the first cryptographic communication system is configured to operate within a cryptographic communication network, wherein the cryptographic communication network further comprises a second cryptographic communication system.

In some embodiments of the first cryptographic communication system, the second cryptographic communication system is configured to communicate with the first cryptographic communication system via the local cryptographic signal.

In some embodiments of the first cryptographic communication system, the second cryptographic communication system is configured to communicate with the first cryptographic communication system via the coalition cryptographic signal.

In some embodiments of the first cryptographic communication system, the second cryptographic communication system is configured to communicate with the first cryptographic communication system via the local cryptographic signal and the coalition cryptographic signal.

A cryptographic communication network is also disclosed. In one or more embodiments, cryptographic communication network includes a first cryptographic communication system. In one or more embodiments, the first cryptographic communication system includes a common hardware module configured to receive local cryptographic signals and coalition cryptographic signals. In some embodiments, the common hardware module includes a receiver. In some embodiments, the common hardware module includes a transmitter. In some embodiments, the common hardware module includes a common router. In some embodiments, the common hardware module includes a data loader communicatively coupled to the common router. In some embodiments, the common hardware module includes a trusted router. In some embodiments, the first cryptographic communication system includes a local cryptographic assembly configure to process the local cryptographic signals. In some embodiments, the local cryptographic assembly includes a local end cryptographic unit coupled to the common router. In some embodiments, the local cryptographic assembly includes a local cross domain guard communicatively coupled to the local end cryptographic unit and the trusted router. In some embodiments, the local cryptographic assembly includes one or more local general purpose security modules communicatively coupled to the local cross domain guard. In some embodiments, the first cryptographic communication system includes a coalition cryptographic assembly configured to process the local cryptographic signals. In some embodiments, the coalition cryptographic assembly includes a coalition end cryptographic unit communicatively coupled to the common router. In some embodiments, the coalition cryptographic assembly includes a coalition cross domain guard communicatively coupled to the local end cryptographic unit and the trusted router. In some embodiments, the coalition cryptographic assembly includes one or more coalition general purpose security modules communicatively coupled to the local cross domain guard. In some embodiments, the first cryptographic communication system includes a data recording module communicatively coupled to the data loader. In some embodiments, the data recording module includes a local data recording device. In some embodiments, the data recording module includes a coalition data recording device.

In some embodiments of the cryptographic communication network, the first cryptographic communication system is configured to accommodate multiple channels.

In some embodiments of the cryptographic communication network, each channel within the multiple channels are configured to independently host a cryptographic algorithm.

In some embodiments of the cryptographic communication network, the cryptographic communication network further includes a second cryptographic communication system communicatively coupled to the first cryptographic communication system.

In some embodiments of the cryptographic communication network, the second cryptographic communication system is configured to communicate with the first cryptographic communication system via the local cryptographic signal.

In some embodiments of the cryptographic communication network, the second cryptographic communication system is configured to communicate with the first cryptographic communication system via the coalition cryptographic signal.

In some embodiments of the cryptographic communication network, the second cryptographic communication system is configured to communicate with the first cryptographic communication system via the local cryptographic signal and the coalition cryptographic signal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A cryptographic communication system is disclosed. More specifically, a cryptographic communication system is disclosed capable of handling multiple levels of secure information (e.g., sensitive but unclassified (SBU) messages and top secret (TS) messages, telemetry data, or software) and allowing different agents within the encrypted communication system (e.g., domestic/local agents and coalition agents) to have different levels of access to decryption protocols and decrypted messages. For example, the system may grant a domestic agent full access to domestic-specific encrypted messages, partial or full access to coalition-specific messages, and partial access, or no access, to coalition ally-specific encrypted messages. The system may be incorporated into any environment requiring organization of domestic and coalition encrypted messages, such as in a network of coalition fighter aircraft, where coalition-wide messages must be decrypted for all fighter aircraft within the network, but will still allow specific agents to decrypt specific messages from a coalition's party.

Figure 1:
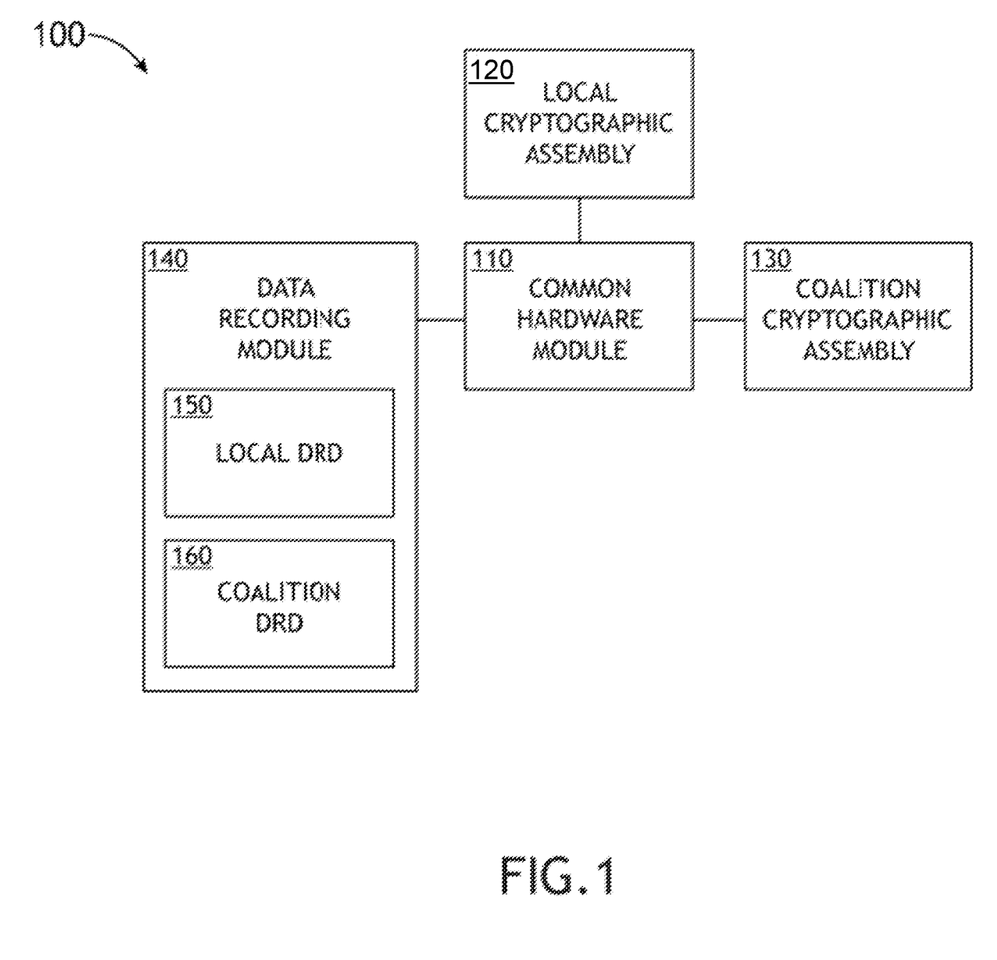
FIG. 1 is a block diagram illustrating a first cryptographic communication system, in accordance one or more embodiments of the disclosure.

FIG. 1 illustrates a block diagram of a first cryptographic communication system 100, in accordance one or more embodiments of the disclosure. In embodiments, the first cryptographic communication system 100 includes a common hardware module 110. The common hardware module 110 provides the receiving and transmitting hardware necessary to send and receive messages for the first cryptographic communication system 100 as well as componentry required to fulfill mission goals. For example, the common hardware module 110 may include an aircraft. In another example, the common hardware module 110 may include an automobile. In another example, the common hardware module may include a tactical operation center (TOC).

In embodiments, the first cryptographic communication system 100 includes a local cryptographic assembly 120. The local cryptographic assembly 120 is a locally certified assembly that cryptographically processes (e.g., encrypts and/or decrypts) local-specific radio communications (e.g., data). For example, for a multinational coalition that includes the United States as a coalition participant, a United States aircraft may operate a first cryptographic communication system 100 having a local cryptographic assembly 120 certified by the United States government (USG). For instance, the local cryptographic assembly 120 may represent a United States-managed domain that is certified by the USG, having USG-certified applications running on USG-certified hardware (e.g., the USG-certified hardware having Type-1 equipment configured to process classified messages).

It should be understood that Type-1 products are generally cryptographic equipment, assemblies or components classified or certified by the National Security Agency (NSA) for encrypting and decrypting classified and sensitive national security information when appropriately keyed. The term "Type-1" may also refer to any cryptographic algorithm that has been approved by NSA for use within Type 1 equipment. For example, a Type-1 product may include a 256-bit AES (Advanced Encryption Standard), categorized as an NSA Suite B algorithm. In another example, Type-1 equipment may include a HAIPE (High Assurance Internet Protocol Encryptor), which is a device that protects network traffic with NSA Type 1 encryption. The general term COMSEC (communications security) material is also often used to refer to Type 1 cryptographic hardware and keys.

It should also be understood that Type-3 products are unclassified cryptographic equipment, assemblies, or components that are used, when appropriately keyed, for encrypting or decrypting unclassified sensitive U.S. Government or commercial information, and to protect systems requiring protection mechanisms consistent with standard commercial practices (e.g., Type-3 equipment and algorithms are used to process unclassified material).

In embodiments, the first cryptographic communication system 100 includes a coalition cryptographic assembly 130. The coalition cryptographic assembly 130 is a coalition participant-certified domain that processes (e.g., encrypts and/or decrypts) coalition participant data for the first cryptographic communication system 100. For example, a United States aircraft operating a first cryptographic communication system 100 that includes a local cryptographic assembly 120, may also include a coalition cryptographic assembly 120 certified by the German government (e.g., a coalition member). The coalition participant is responsible for certifying their applications that execute on hardware within the coalition cryptographic assembly 130. The hardware for the coalition cryptographic assembly 130 may consist of commercial-off-the-shelf (COTS) technology (e.g., having Type-3 equipment to process classified messages). The hardware for the coalition cryptographic assembly 130 may also include country specific cryptography that may be certified by that country as well.

The first coalition communication system 100 may include more than one coalition cryptographic assembly 130 (e.g., one from each non-local coalition participant) that are interoperable with each other and with the local cryptographic assembly 120. The coalition cryptographic assembly 130 and the local cryptographic assembly 120 are also capable of processing multiple levels of security (MLS) (e.g., SBU data and TS data). The interoperability between the one or more coalition cryptographic assemblies 130 and the local cryptographic assembly 120 may be selective, such that the one or more coalition cryptographic assemblies 130 and local cryptographic assembly 120 may be not be fully interoperable with another one or more coalition cryptographic assemblies 130 and local cryptographic assembly 120. For example, the first cryptographic communication may be configured so that only SBU data (i.e., not TS data) is shared between the one or more local coalition assemblies 130 and the local cryptographic assembly 120. In this manner, a participant (e.g., such as an aircraft pilot) may communicate via high level encryption with a member of their specific local participant or trusted coalition participant while also communicating with other less trusted coalition participants via Type-3 or other levels of encryption.

In embodiments, the first cryptographic communication system 100 includes a data recording module 140 for recording mission data/messages. The data recording module 140 includes one or more local data recording devices (DRD) 150 that records Type-1 encrypted (data at rest protection) data/messages (e.g., high level encryption certified by the local participant, such as the USG). The data recording module 140 further includes one or more coalition DRDs 160 that records Type-3, or other non Type-1 encrypted data/messages, or data/messages encrypted by other coalition participant specific encryption protocols. The one or more coalition DRDs 160 allow a coalition participant to load their own data onto the first cryptographic system 100 in a manner independent from the data from the local participants. In some embodiments, the local DRDs 150 and coalition DRDs 160 are configured to be interchangeable.

Figure 2:
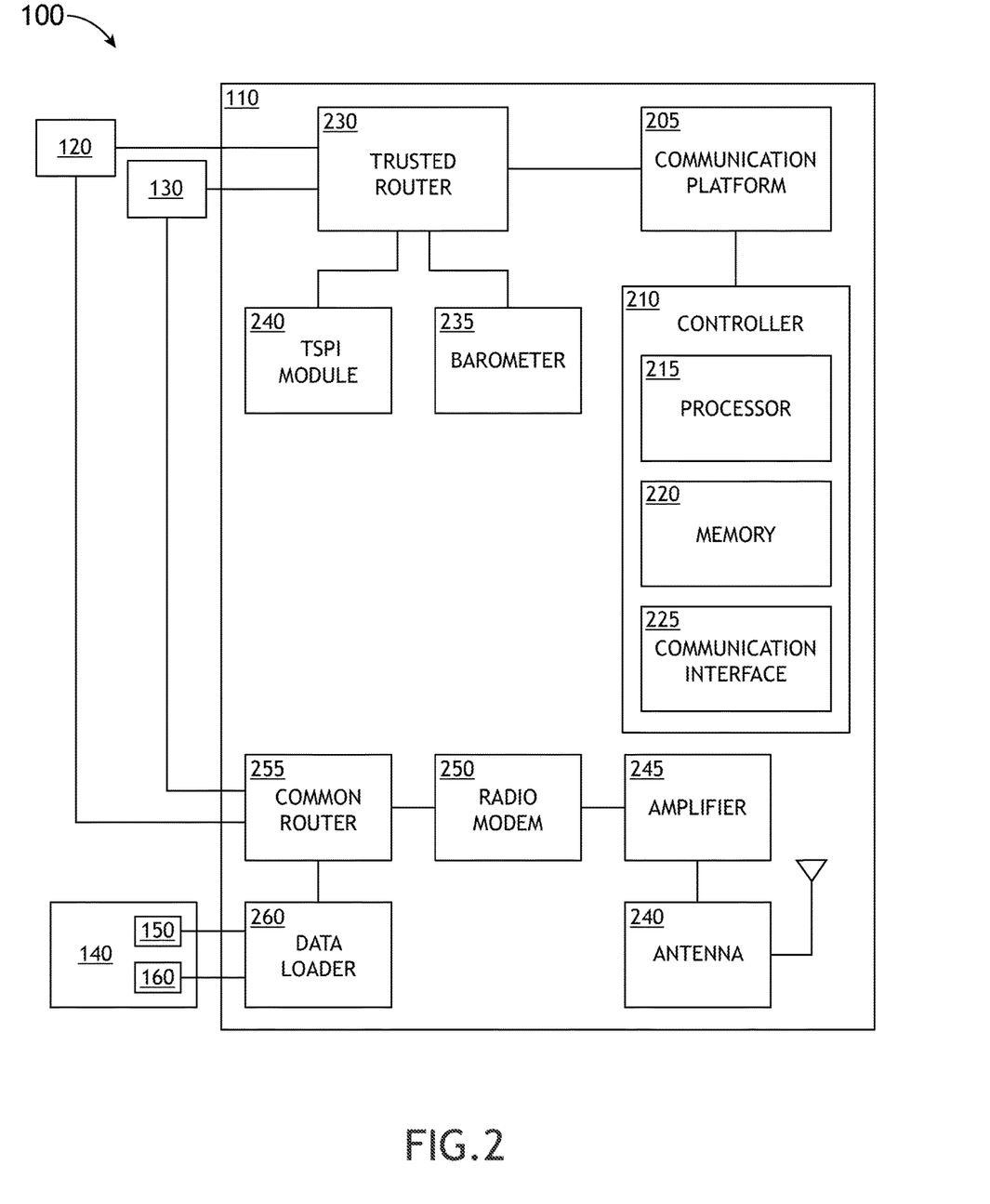
FIG. 2 is a block diagram illustrating the common hardware module, in accordance with one or more embodiments of the disclosure.

FIG. 2 is a block diagram illustrating the common hardware module 110, in accordance with one or more embodiments of the disclosure. In some embodiments, the common hardware module 110 includes a communication platform 205. The communication platform 205 includes communication componentry required for operating the first cryptographic communication system 100 including but not limited to speakers, microphones, displays, and user interface devices (e.g., touchscreens and keyboards). For example, the communication platform 205 may include a receiver. In another example, the communication platform 205 may include a transmitter. In another example, the communication platform 205 may include a transceiver. The communication platform 205 may receive decrypted messages/data from the local cryptographic assembly 120 and/or the coalition cryptographic assembly 130 and broadcast unencrypted data/messages to the local cryptographic assembly 120 and/or the coalition cryptographic assembly 130, where the data/messages are encrypted and transmitted.

In some embodiments, the common hardware module 110 includes one or more controllers 210. The one or more controllers 210 may include one or more processors 215, memory 220, and a communication interface 225. The memory 220 may store one or more sets of program instructions. The one or more processors 215 may be configured to execute the one or more sets of program instructions to carry out one or more of the various steps described throughout the present disclosure. In some embodiments, the one or more controllers 210 includes or is coupled to the communication platform 205 and other componentry of the common hardware module 110 as well as other componentry within the first cryptographic communication system 100 (e.g., the one or more controllers may be coupled to the componentry within the local cryptographic assembly 120, the coalition cryptographic assembly, and/or the data recording module).

The one or more processors 215 may include any one or more processing elements known in the art. In this sense, the one or more processors 215 may include any microprocessor device configured to execute algorithms and/or program instructions. In general, the term "processor" may be broadly defined to encompass any device having one or more processing elements, which execute a set of program instructions from a non-transitory memory medium (e.g., the memory 220), where the one or more sets of program instructions is configured to cause the one or more processors 215 to carry out any of one or more process steps.

The memory 220 may include any storage medium known in the art suitable for storing the one or more sets of program instructions executable by the associated one or more processors 215. For example, the memory 220 may include a non-transitory memory medium. For instance, the memory 220 may include, but is not limited to, a read-only memory (ROM), a random-access memory (RAM), a magnetic or optical memory device (e.g., disk), a magnetic tape, a solid-state drive, and the like. The memory 220 may be configured to provide data and/or messages to the communication platform 205. In addition, the memory 220 may be configured to store participant input information from the communication platform 205. The memory 220 may be housed in a common controller housing with the one or more processors 215. The memory 220 may, alternatively or in addition, be located remotely with respect to the spatial location of the processors 215, or the one or more controllers 210. For example, the one or more processors 215 and/or one or more controllers 210 may access a remote memory 220 accessible through a network (e.g., wireless, and the like) via one or more communication interfaces 225.

The one or more communication interfaces 225 may be operatively configured to communicate with components of the one or more controllers 210. For example, the one or more communication interfaces 225 may be configured to retrieve data from the one or more processors 215 or other devices, transmit data for storage in the memory 220, retrieve data from storage in the memory 220, and so forth.

The one or more communication interfaces 225 may also be communicatively coupled with the one or more processors 215 to facilitate data transfer between components of the one or more controllers 210 and the one or more processors 215 It should be noted that while the one or more communication interfaces 225 is described as a component of the one or more controllers 210, one or more components of the one or more communication interfaces 225 may be implemented as external components communicatively coupled to the one or more controllers 210 via a wired and/or wireless connection.

In embodiments, the common hardware module 110 includes a trusted router 230. The trusted router 230 controls the flow of data/messages between the communication platform 205 and both the local cryptographic assembly 120 and the coalition cryptographic assembly 130. The control of the flow of data and/or messages includes enforcing communication policy between the componentry of the common hardware module 110 and both the local cryptographic assembly 120 and the coalition cryptographic assembly 130 (e.g., the trusted router 230 is the mechanism for command and control for each of the local cryptographic assembly 120 and the coalition cryptographic assembly 130). The trusted router 230 may be controlled by the operator of the common hardware module 110, and policies for controlling the trusted router 230 may be controlled by the operator of the common hardware module 110, the owner of the common hardware module 110, and/or the owner of the vehicle or device that contains the common hardware module 110.

In embodiments, the trusted router 230 may control the flow of data and/or messages from other componentry within the common hardware module 110. For example, the common hardware module 110 may include a barometer 235 communicatively coupled to the trusted router 230. In another example, the common hardware module 110 may include a time-space-position information (TSPI) module 240 communicatively coupled to the trusted router 230. The trusted router 230 may control the flow of barometer data and/or TSPI data to the communication platform 205 or to other componentry within the first cryptographic communication system 100. Other instruments may be similarly coupled to the trusted router 230. Therefore, the above description should not be interpreted as a limitation of the present disclosure, but merely as an illustration.

In embodiments, the common hardware module 110 includes an antenna 240. The antenna may be configured to receive and/or transmit data and/or messages from the common hardware module 110. The antenna 240 may include any type of antenna 240 known including but not limited to wire antennas, aperture antennas, reflector antennas, lens antennas, microstrip antennas, and array antennas. For example, the antenna 240 may be configured as an active electronically scanned antenna. In another example, the antenna 240 may be configured as a horn antenna.

In embodiments, the common hardware module 110 includes one or more amplifiers 245 communicatively coupled to the antenna 240 configured to amplify received and/or transmitted signals. For example, the one or more amplifiers 245 may be configured as a power amplifier to amplify output signals to be transmitted via the antenna 245. In another example, the one or more amplifiers 245 may be configured as a low noise amplifier configured to amplify input signals received from the antenna 245.

In embodiments, the common hardware module 110 includes one or more radio modems 250 communicatively coupled to the one or more amplifiers 245. The one or more radio modems 250 are configured to modulate incoming analog signals into digital information and/or demodulate outgoing digital signals into an analog signal for transmission. Any type of radio modem 250 may be used within the common hardware module including but not limited to transparent modems (e.g., half-duplex modems), duplex modems, HF modems, UHF modems, and UHF modems.

In embodiments, the common hardware module 110 includes a common router 255 communicatively coupled to the one or more radio modems 250. The common router 255 manages the distribution of data loads to the local cryptographic assembly 120 and/or the coalition cryptographic assembly 130. The common router 255 may be configured as any type of communication router. For example, the common router 255 may be configured as a wireless or wirelines router.

In embodiments, the common hardware module 110 includes a data loader 260. The data loader 260 is configured to load/install data to components within the first cryptographic communication system 100 (e.g., recording devices and flight management systems) The data loader may be communicatively coupled to any components with the first cryptographic communication system 100. For example, the data loader 260 may be communicatively coupled to the local DRD 150. In another example, the data loader 260 may be communicatively coupled to the coalition DRD 160. The data loader 260 may include any type of data loading device known including but not limited to a CPAS-3000 data loader vended by Rockwell Collins.

It should be understood that the common hardware module 110 may contain any combination of components. For example, the common hardware module 110 may lack an antenna 240. In another example, the common hardware module 110 may lack an amplifier 245. In another example, the common hardware module 110 may lack a radio modem. Therefore, the above description should not be interpreted as a limitation of the present disclosure, but merely as an illustration.

Figure 3:
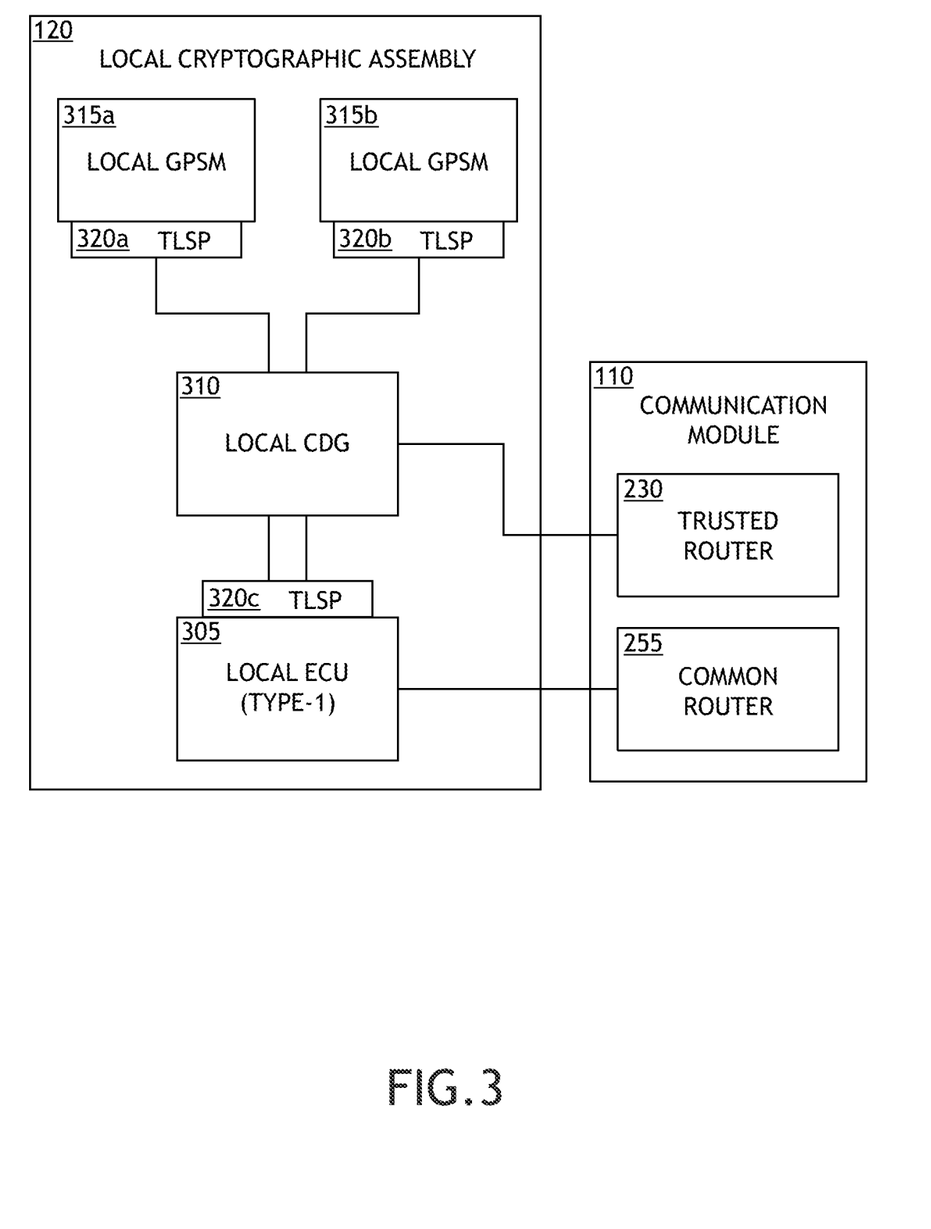
FIG. 3 is a block diagram illustrating the local cryptographic assembly, in accordance with one or more embodiments of the disclosure.

FIG. 3 is a block diagram illustrating the local cryptographic assembly 120, in accordance with one or more embodiments of the disclosure. The local cryptographic assembly may be configured to support highly-sensitive (e.g., Type-1) cryptography, which is approved to protect highly sensitive data ranging from sensitive-but-unclassified (SBU) to top secret (TS) data. For example, the local cryptographic assembly 120 may support Type-1 cryptography through the implementation of certified (e.g., NSA certified), algorithms (e.g., such as Suite A algorithms used by the USG). Suite A algorithms cannot be exported outside the US to all foreign entities, therefore the local cryptographic assembly 120 provides a local- or country-specific domain that can be used for processing of highly-sensitive messages for the local participant and available trusted allies.

In some embodiments, the local cryptographic assembly 120 includes a local end cryptographic unit (ECU) 305 communicatively coupled to the common router 255. The local ECU 305 encrypts and decrypts transmitted and/or recorded data. For example, the local ECU 305 may decrypt type-1 cryptographic SBU messages received from the common router 255. The local ECU 305 may include any type of end cryptographic unit including but not limited to a multi-channel KOV-74 end cryptographic unit vended by Rockwell Collins that implements both NSA-certified Suite A and Suite B algorithms and is programmable to implement additional algorithms.

In some embodiments, the local cryptographic assembly 120 is capable of accommodating multiple channels via the local ECU 305. For example, the local ECU 305 may be configured as a multichannel ECU, with each channel capable of hosting a different algorithm.

In some embodiments, the local cryptographic assembly 120 includes a local cross domain guard (CDG) 310 communicatively coupled to the local ECU 305 and the trusted router 230. The local CDG 310 operates to enable or restrict the access or transfer to information between two or more security domains (e.g., the local cryptographic assembly 120 and the one or more coalition cryptographic assemblies 130) based on a predetermined security policy. The security policy of the local CDG 310 defines what data and componentry the trusted router 230 may control and/or access. The local CDG 310 includes software, hardware, and or firmware needed to perform cross domain guard functions and may include any cross domain guard known including but not limited to a multiple independent levels of security (MILS) guard. For instance, the local CDG 310 may include a Turnstile™ High Assurance Guard vended by Rockwell Collins. In some embodiments, the local CDG 310 is configured as a multichannel cross domain guard.

In some embodiments, the local cryptographic assembly 120 includes one or more local general purpose security modules (GPSM) 315a, 315b communicatively coupled to the local CDG 310. The one or more local GPSMs 315a, 315b performs processing functions required for the first cryptographic communication system 100. For example, one of the one or more local GPSMs 315a, 315b may be configured to secure cryptographic processes by generating, protecting, and/or managing cryptographic keys. In another example, one of the one or more local GPSMs 315a, 315b may be configured to create digital signatures and/or digital certificates. The one or more local GPSMs 315a, 315b may be configured to operate at a single level of security or at multiple levels of security. The local GPSMs 315a, 315b may be configured as any security module known including but not limited to hardware security modules (HSMs) that are compliant with federal information processing standards (FIPS) or other country/coalition standards. For example, the local GPSM 315a, 315b may be configured as a HSM that has been validated under FIPS 140-2. In another example, the local GPSM 315a, 315b may be configured as a HSM in compliance with a German certification authority (e.g., the FID).

In some embodiments, the local cryptographic assembly 120 includes multiple transport layer security protocols (TLSP) 320a-c that allow tunneling to occur between the components of the local cryptographic assembly 120 and other components within the first cryptographic communication system 100. Tunneling is a known method of providing encryption at each endpoint through use of a key management infrastructure. Tunneling provides an additional layer of security above the local CDG 310 for end to end transmissions. However, the tunneling mechanism is modified to allow for local CDG 310 inspection of the tunneled packet to ensure labels conform to the allowed levels of security.

Figure 4:
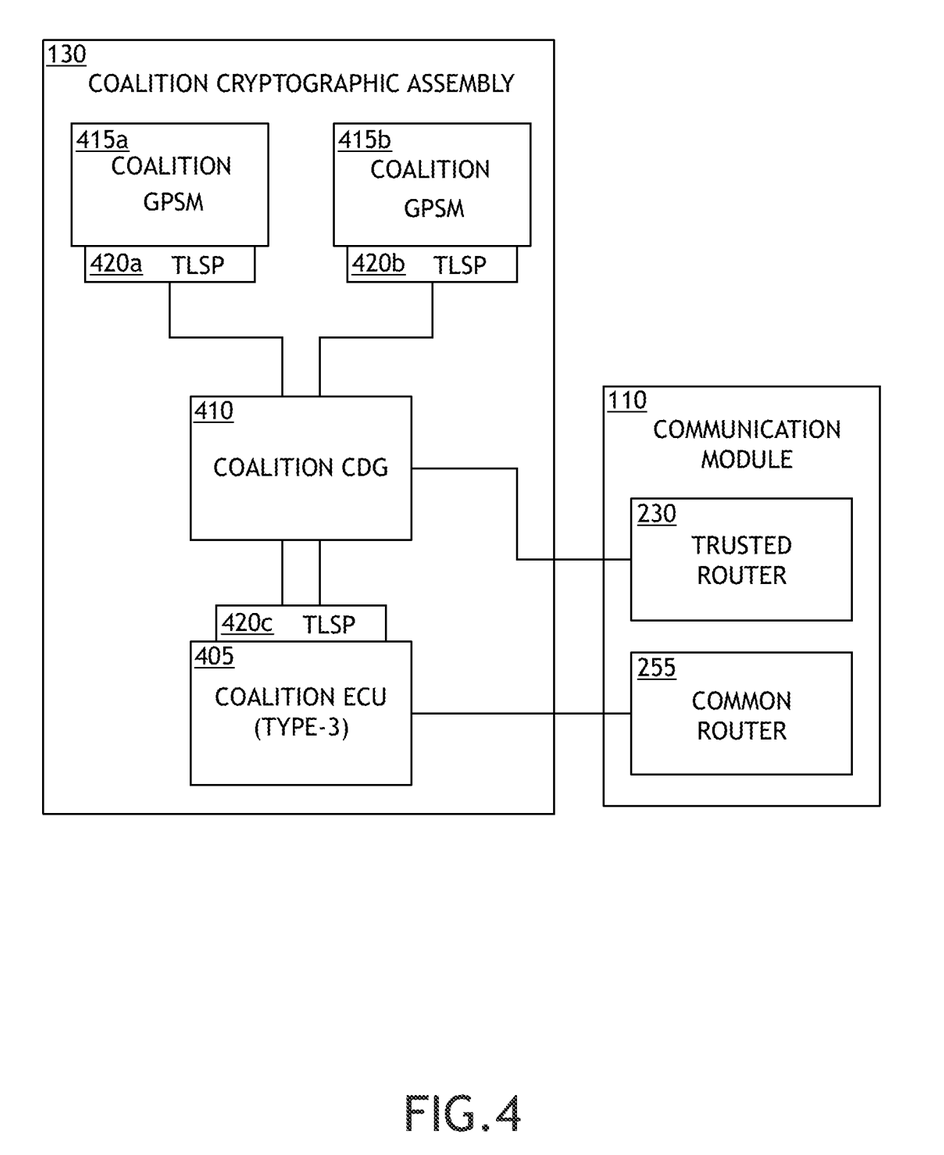
FIG. 4 is a block diagram illustrating the coalition cryptographic assembly, in accordance with one or more embodiments of the disclosure.

FIG. 4 is a block diagram illustrating the coalition cryptographic assembly 130, in accordance with one or more embodiments of the disclosure. The coalition cryptographic assembly 130 may be configured to support (e.g., Type-3) cryptography. Type-3 cryptography is intended for coalition participants and enclaves to communicate securely with the local participant (e.g., while the local participant may use the local cryptographic assembly 120 to communicate securely with local participant agents and available trusted coalition participants.

In some embodiments, the coalition cryptographic assembly 130 includes a coalition end cryptographic unit (ECU) 405 communicatively coupled to the common router 255. The coalition ECU 405 encrypts and decrypts transmitted and/or recorded data. For example, the coalition ECU 405 may decrypt Type-3 cryptographic SBU messages received from the common router 255 (e.g., the coalition ECU 405 may include a Type-3 module). The coalition ECU 405 may include any type of end cryptographic unit including but not limited to a KOV-74 end cryptographic unit vended by Rockwell Collins.

In some embodiments, the coalition cryptographic assembly 130 is capable of accommodating multiple channels via the coalition ECU 405. For example, the coalition ECU 405 may be configured as a multichannel ECU, with each channel capable of hosting different algorithms. For example, the coalitions ECU 405, as well as the local ECU 305, may have one channel hosting a Suite B algorithm certified by the NSA to protect SBU data and or TS data, while another channel hosts algorithms certified to FIPS 140-2 for protecting only SBU data. The cryptographic algorithms used in the coalition ECU 405 and/or local ECU 350 may also be used by other coalition participants in their respective cryptographic schemes. For example, Suite B algorithms may be certified by the NSA to protect SBU up to Secret, but can also be validated under FIPS 140-2 (e.g., or any equivalent domestic or internationally accepted standard for encryption) and exported to Canada and the UK or other coalition partners. FIPS 140-2 has also been adopted by other governments in Europe, Latin America, and Asia. In another example, other open standard algorithms may be implemented and approved by NSA to be hosted in one or more of the coalition ECU 405 and/or local ECU 305 channels and could be certified by other entities and approved for interoperation when using a shared key. For coalition participant interoperability, FIPS 140-2 validated cryptography may be developed that implements the Suite B algorithms in common with the coalition ECU 405 and/or local ECU 305. The coalition ECU 405 and/or local ECU 305 may be programmable, allowing commonality between the coalition ECU 405 and/or local ECU 305 and the FIPS 140-2 cryptography to enable international interoperability at the SBU level or any other desired and agreed upon level. Significant benefit is achieved with multi-channel & multi-level solutions to enable both DoD specific and coalition partner unique communication as well as dedicated channels to support interoperability In some embodiments, the coalition cryptographic assembly 130 includes a coalition cross domain guard (CDG) 410 communicatively coupled to the coalition ECU 405 and the trusted router 230. The coalition CDG 410 operates to enable or restrict the access or transfer to information between two or more security domains (e.g., the local cryptographic assembly 120 and the one or more coalition cryptographic assemblies 130) based on a predetermined security policy. The security policy of the coalition CDG 410 defines what data and componentry the trusted router 230 may control and/or access. The coalition CDG 410 includes software, hardware, and or firmware needed to perform cross domain guard functions and may include any cross domain guard known including but not limited to a multiple independent levels of security (MILS) guard. For instance, the coalition CDG 410 may include a Turnstile™ High Assurance Guard vended by Rockwell Collins. In some embodiments, the local CDG 410 is configured as a multichannel cross domain guard.

In some embodiments, the coalition cryptographic assembly 130 includes one or more coalition general purpose security modules (GPSM) 415a, 415b communicatively coupled to the coalition CDG 410. The one or more coalition GPSMs 415a, 415b performs processing functions required for the first cryptographic communication system 100. For example, one of the one or more coalition GPSMs 415a, 415b may be configured to secure cryptographic processes by generating, protecting, and/or managing cryptographic keys. In another example, one of the one or more coalition GPSMs 415a, 415b may be configured to create digital signatures and/or digital certificates. In another example, one or more coalition GPSMs 215a, 415b may be configured to execute sensitive but unclassified computational algorithms. The one or more coalition GPSMs 415a, 415b may be configured to operate at a single level of security or at multiple levels of security. The coalition GPSMs 415a, 415b may be configured as any security module known including but not limited to hardware security modules (HSMs) that are compliant with federal information processing standards (FIPS) or other country/coalition standards. Each coalition participant may be responsible for certifying their application executing on the coalition GPSM, as well as other hardware on the coalition cryptographic assembly 130. For example, the coalition GPSM 415a, 415b may be configured as a HSM that has been validated under FIPS 140-2. In another example, the coalition GPSM 415a, 415b may be configured as a HSM in compliance with a German certification authority (e.g., the FID).

In some embodiments, the coalition cryptographic assembly 130 includes multiple transport layer security protocols (TLSP) 420a-c that allow tunneling to occur between the components of the coalition cryptographic assembly 130 and other components within the first cryptographic communication system 100. Tunneling is a known method of providing encryption at each endpoint through use of a key management infrastructure. Tunneling provides an additional layer of security above the coalition CDG 410 for end to end transmissions. However, the tunneling mechanism is modified to allow for coalition CDG 410 inspection of the tunneled packet to ensure labels conform to the allowed levels of security.

Figure 5:
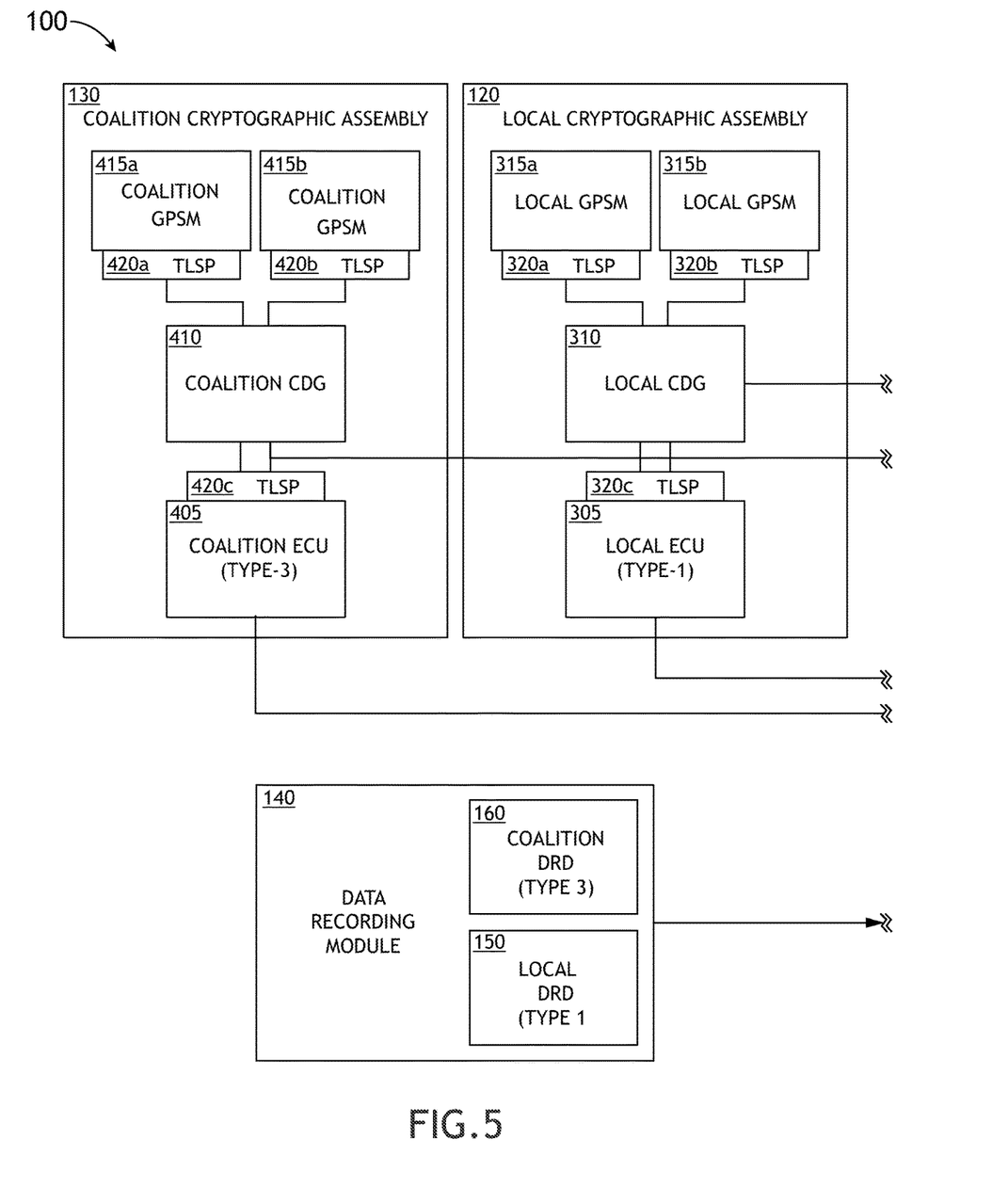
FIG. 5 is a detailed block diagram of the first cryptographic communication system 100, in accordance with one or more embodiments of the disclosure.

FIG. 5 is a detailed block diagram of the first cryptographic communication system 100, in accordance with one or more embodiments of the disclosure. The division of the first cryptographic communication system 100 into four parts (e.g., the common hardware module 110, the local cryptographic assembly 120, the coalition cryptographic assembly 130, and the data recording module 140) allows separation of cryptographic certification, data management, data processing, and data control within a single vehicle, communication device, or TOC. This arrangement allows one or more parts of the first cryptographic communication system 100 to be quickly swapped with mission-specific or participant-componentry and/or software while reducing cost- or labor-intensive modifications to common hardware within the common hardware module 110. For example, if a coalition participant is added during a mission, only the one or more coalition cryptographic assemblies 130 may need to be swapped out for a new coalition cryptographic assembly 130 that is certified by the new coalition participant. In another example, for a change in Type-1 encryption that requires different componentry, only the local cryptographic assembly 120 may need to be swapped with the updated local cryptographic assembly 120. In another example, the coalition cryptographic assembly 130 may be omitted (i.e., during a non-coalition mission, the coalition cryptographic assembly 130 may not be needed). In another example, the local cryptographic assembly 120 may be omitted (i.e., during a coalition-only mission, the local cryptographic assembly may not be needed). In some embodiments, the absence or presence of a specific component of the first cryptographic communication system 100 may be the result of software implementation (i.e., programmable code implements the function of one or more components).

Figure 6:
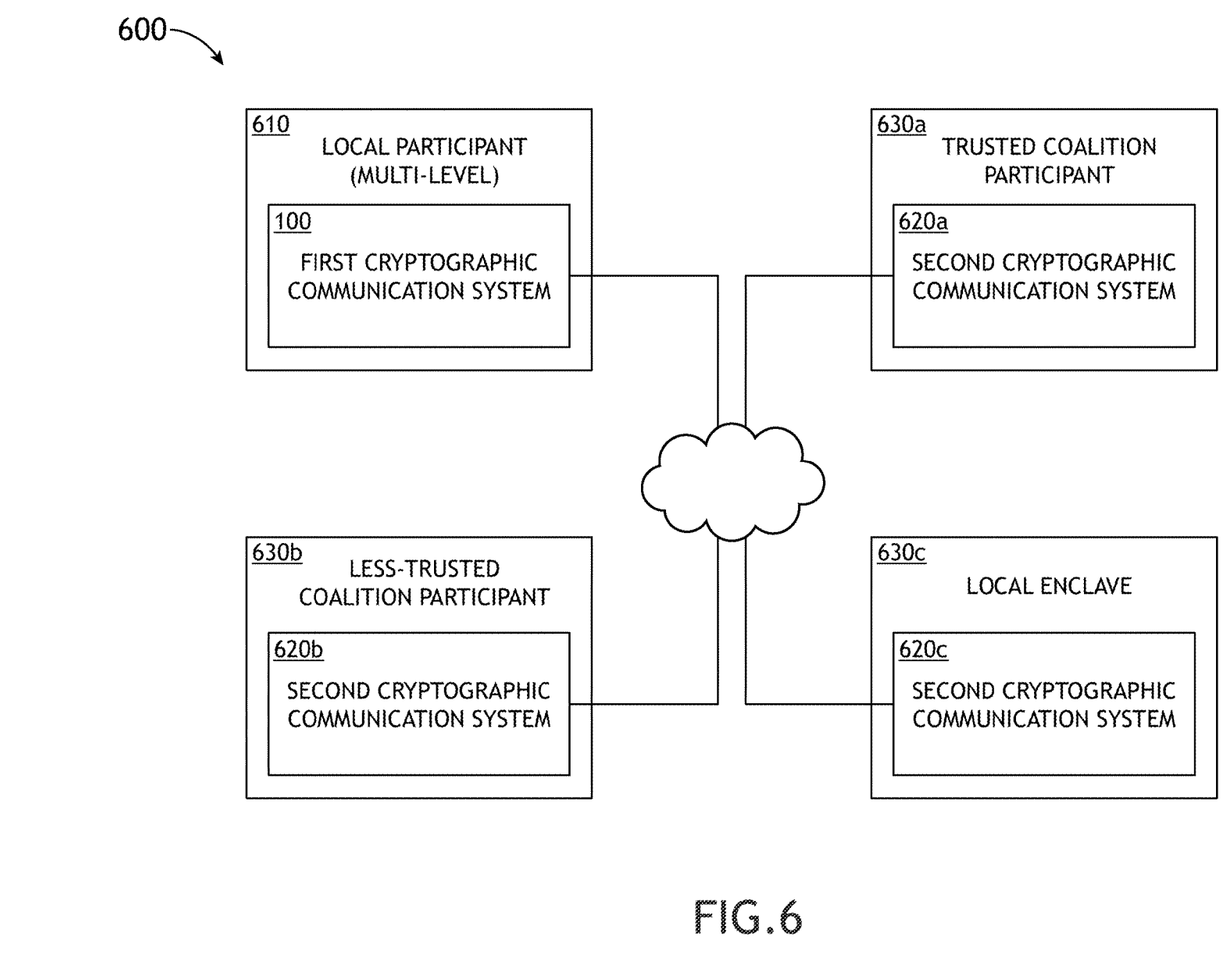
FIG. 6 is a block diagram illustrating a cryptographic communication network, in accordance with one or more embodiments of the disclosure.

FIG. 6 is a block diagram illustrating a cryptographic communication network 600, in accordance with one or more embodiments of the disclosure. The cryptographic communication network is configured so that multiple participants in a coalition may communicate with each other while using cryptographic methods and cross domain controls. For example, coalition participants may operate the cryptographic communication network for communicating test, training and/or live virtual constructive (LVC) data at different classification level (e.g., SBU and/or TS). In another example, each coalition participant may operate Type-3 cryptography to encrypt and decrypt data from each of the other coalition participants, but may use Type-1 cryptography for data entrusted to a select group within the coalition. Coalition participants within the cryptographic communication network 600 may be communicatively coupled to each other via any wireless or wireline methods. For example, the coalition participants may communicate via HF or UHF signals.

In some embodiments, the cryptographic communication network 600 includes a local participant 610 configured with the first cryptographic communication system 100. For example, the first cryptographic communication system 100 for the local participant 610 may be configured to handle multiple security levels (e.g., SBU and TS) and operate with Type-1 and Type-3 cryptography concurrently or consecutively, depending on the data received.

In some embodiments, the cryptographic communication network 600 includes one or more second cryptographic communication systems 620a-c communicatively coupled to the first cryptographic communication system 100. The one or more second cryptographic communication systems 620a-c may include one or more of the same components of the first cryptographic communication system. Each of the one or more second cryptographic communication systems 620a-c may have different componentry and/or use different sets of cryptographic protocols. For example, the cryptographic communication network 600 may include a squadron of twelve aircraft, with each aircraft owned by a different country within a coalition, with one of the aircraft configured with a first cryptographic communication system 100, and each of the other aircraft having different second cryptographic communication systems 620a-c (e.g., with each of the second communication systems 620a-c capable of communicating with the first cryptographic communication system 100 via Type-3 and/or Type-1 cryptographic protocols. The second cryptographic communication system 620a-c may be configured to process either single or multiple levels of encrypted data (e.g., SBU and/or TS).

In some embodiments, the second cryptographic communication system 620 is configured to communicate with the first cryptographic communication system 100 via local cryptographic signals and coalition cryptographic signals (e.g., using Type-1 and Type-3 cryptographic protocols). For example, a trusted coalition participant 630a may operate aircraft incorporating a second cryptographic communication system 620a that allows both Type-1 and Type-3 cryptographic protocols to be used when in communication with the local participant 610.

In some embodiments, the second cryptographic communication system 620 is configured to communicate with the first cryptographic communication system 100 via coalition cryptographic signals (i.e., using only Type-3 protocols). For example, less-trusted coalition participant 630b may operate aircraft incorporating a second cryptographic system 620b that allows only Type-3 cryptographic protocols to be used when in communication with the local participant 610.

In some embodiments, the second cryptographic communication system 620 is configured to communicate with the first cryptographic communication system 100 via local cryptographic signals (i.e., using only Type-1 protocols). For example, an aircraft from a local enclave 620c (e.g., an aircraft from a different military branch of the local participant's government that is not a part of the coalition force) may incorporate a second cryptographic system that allows only Type-3 cryptographic protocols to be used when in communication with the local participant 610.

In some embodiments, the first cryptographic communication system 100 and at least one of the one or more second cryptographic communication systems 620 support the export of a shared key for interoperability. The shared keys may activate different levels of cryptography depending on the trust levels between local and coalition participants. For example, a shared key may be exported between highly trusted pairs of local and/or coalition participants, allowing shared encryption/decryption of TS data. In another example, a shared key may be exported between less-trusted local participant 610 and/or coalition participants 630, allowing shared encryption/decryption of SBU data. In some embodiments, a shared key may be created and distributed to all entities for the interoperable cryptography channel. In some embodiments, the first cryptographic communication systems and/or one or more second cryptographic communication system 620 detect and implement export of key material (e.g., "unclassified" key material).

In some embodiments, the coalition cryptographic assembly 130 is configured via the coalition ECU 405 to initiate an Elliptic Curve Diffie-Hellman (ECDH) session key exchange using an SBU Elliptic Curve Digital Signature Algorithm (ECDSA) private keys and public key certificates. For example, a coalition participant 630 may initiate a ECDH session key exchange with a local participant 610 or local enclave 630c using SBU ECDSA private keys and public key certificates. This secure exchange may use Over-the-Air Bypass (OTAB) through the ECUs using Type-1 cryptography. Other types of public or private secure key exchange/establishment algorithms may be also be utilized (e.g., based on ECDH, ECDSA, or other algorithms). For example, the first cryptographic communication system 100 may utilize supersingular isogeny Diffie—Hellman key exchange (SIDH) algorithms intended to resist attacks by quantum computers.

In some embodiments, the local CDG 310 and/or the coalition CDG 410 commands the local ECU 305 and/or coalition ECU 405 to export SBU keys (e.g., traffic keys). These SBU keys may be used by the local ECU 305 and/or coalition ECU 405 to communicate SBU data, and may be securely stored under Type-1 encryption until export.

In some embodiments, the local CDG 310 and/or the coalition CDG 410 encrypts the SBU key (e.g., traffic key) using AES-256 encryption and the ECDH session key, and transfers the SBU key through Type-1 encryption via OTAB to the local ECU 305 and/or coalition ECU 405 (e.g., using Type-3 encryption). The local ECU 305 and/or coalition ECU 405 may then decrypt and import the SBU key. In some embodiments, the local ECU 305 and/or coalition ECU 405 encrypts/decrypts SBU data via Type-1 encryption, which may then be encrypted/decrypted by the local ECU 305 and/or coalition ECU 405 via Type-3 encryption.

The cryptographic communication network 600 that includes first cryptographic communication systems 100 and second cryptographic communication systems 620 may include componentry that is compatible with legacy tactical guard hardware and other cryptographic communication systems and componentry that is available commercially off the shelf (COTS) reducing complexity, time, and costs. FIPS validation avoids costly NSA certifications. For example, COTS Suite B implementations are compatible with the KOV-74.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A first cryptographic communication system comprising:
   a common hardware module configured to receive local cryptographic signals and coalition cryptographic signals comprising:
      a receiver;
      a transmitter;
      a common router;
      a data loader communicatively coupled to the common router; and
      a trusted router;
   a local cryptographic assembly configured to process the local cryptographic signals, comprising:
      a local end cryptographic unit communicatively coupled to the common router;
      a local cross domain guard communicatively coupled to the local end cryptographic unit and the trusted router; and
      one or more local general purpose security modules communicatively coupled to the local cross domain guard;
   a coalition cryptographic assembly configured to process the local cryptographic signals, comprising:
      a coalition end cryptographic unit communicatively coupled to the common router;
      a coalition cross domain guard communicatively coupled to the local end cryptographic unit and the trusted router; and
      one or more coalition general purpose security modules communicatively coupled to the local cross domain guard;
   a data recording module communicatively coupled to the data loader comprising:
      a local data recording device; and
      a coalition data recording device;
   wherein the first cryptographic communication system is configured to operate within a cryptographic communication network comprising a second cryptographic communication system.

2. The first cryptographic communication system of claim 1, wherein the first cryptographic communication system is configured to accommodate multiple channels.

3. The first cryptographic communication system of claim 2, wherein one or more channels within the multiple channels are configured to independently host a cryptographic algorithm.

4. The first cryptographic communication system of claim 1, wherein the first cryptographic communication system is configured with multiple security level processing.

5. The system of claim 1, wherein the second cryptographic communication system is configured to communicate with the first cryptographic communication system via the local cryptographic signal.

6. The system of claim 1, wherein the second cryptographic communication system is configured to communicate with the first cryptographic communication system via the coalition cryptographic signal.

7. The system of claim 1, wherein the second cryptographic communication system is configured to communicate with the first cryptographic communication system via the local cryptographic signal and the coalition cryptographic signal.

8. A cryptographic communication network comprising:
   a first cryptographic communication system comprising:
      a common hardware module configured to receive local cryptographic signals and coalition cryptographic signals comprising:
         a receiver;
         a transmitter;
         a common router;
         a data loader communicatively coupled to the common router; and
         a trusted router;
      a first local cryptographic assembly configured to process the local cryptographic signals, comprising:
         a local end cryptographic unit communicatively coupled to the common router;
         a local cross domain guard communicatively coupled to the local end cryptographic unit and the trusted router; and
         one or more local general purpose security modules communicatively coupled to the local cross domain guard;
      a coalition cryptographic assembly configured to process the local cryptographic signals, comprising:
         a coalition end cryptographic unit communicatively coupled to the common router;
         a coalition cross domain guard communicatively coupled to the local end cryptographic unit and the trusted router; and
         one or more coalition general purpose security modules communicatively coupled to the local cross domain guard;
      a data recording module communicatively coupled to the data loader comprising:
         a local data recording device; and
         a coalition data recording device; and
   a second cryptographic communication system communicatively coupled to the first cryptographic communication system.

9. The network of claim 8, wherein the first cryptographic communication system is configured to accommodate multiple channels.

10. The network of claim 9, wherein each channel within the multiple channels are configured to independently host a cryptographic algorithm.

11. The network of claim 8, wherein the second cryptographic communication system is configured to communicate with the first cryptographic communication system via the local cryptographic signal.

12. The network of claim 8, wherein the second cryptographic communication system is configured to communicate with the first cryptographic communication system via the coalition cryptographic signal.

13. The network of claim 8, wherein the second cryptographic communication system is configured to communicate with the first cryptographic communication system via the local cryptographic signal and the coalition cryptographic signal.

* * * * *